US006886231B2

(12) United States Patent
Lawson et al.

(10) Patent No.: US 6,886,231 B2
(45) Date of Patent: May 3, 2005

(54) ROBOTIC APPARATUS AND METHOD FOR MOUNTING A VALVE STEM ON A WHEEL RIM

(75) Inventors: Lawrence Lawson, Troy, MI (US); Karl D. Sachs, Birmingham, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 104 days.

(21) Appl. No.: 10/264,746

(22) Filed: Oct. 4, 2002

(65) Prior Publication Data

US 2003/0051326 A1 Mar. 20, 2003

Related U.S. Application Data

(63) Continuation-in-part of application No. 09/344,042, filed on Jun. 25, 1999, now Pat. No. 6,481,083.

(51) Int. Cl.[7] .............................................. B23Q 17/00
(52) U.S. Cl. ............................... 29/407.01; 29/407.04; 29/407.05; 29/407.09; 29/407.1; 29/430; 29/709; 29/213.1; 29/221.5; 29/714; 29/802; 901/16; 901/31; 901/47; 73/866.5
(58) Field of Search ........................ 29/407.01, 407.04, 29/407.05, 407.09, 407.1, 430, 709, 720, 787, 795, 213.1, 221.5, 714, 802; 901/16, 31, 46, 47, 50; 73/866.5

(56) References Cited

U.S. PATENT DOCUMENTS

| 3,888,362 | A | * | 6/1975 | Fletcher et al. ............. 414/620 |
| 4,353,156 | A | | 10/1982 | Rosuz |
| 4,614,077 | A | | 9/1986 | Muto et al. |
| 4,807,343 | A | | 2/1989 | Wadsworth |
| 4,841,632 | A | | 6/1989 | Namiki et al. |
| 4,887,341 | A | | 12/1989 | Sakimori |

(Continued)

FOREIGN PATENT DOCUMENTS

| JP | 0209904 | | 11/1984 | |
| JP | 59209904 | | 11/1984 | |
| JP | 01156183 A | * | 6/1989 | ........... B62D/65/00 |
| JP | 05069249 A | * | 3/1993 | ........... B23P/19/06 |
| JP | 2002274131 | | 9/2002 | |

OTHER PUBLICATIONS

European Search Report dated Jan. 2, 2004 from corresponding EPC Application No. 03394093.3–1262–, filed Oct. 3, 2003.

Primary Examiner—David P. Bryant
Assistant Examiner—Jermie E. Cozart
(74) Attorney, Agent, or Firm—Van Dyke, Gardner, Linn & Burkhart, LLP (57) ABSTRACT

An apparatus and method for mounting a valve stem to the rim of an automotive vehicle wheel includes rims being supplied in series by a conveyor to a gauging station where the type and/or size of the rim and the location and alignment of an aperture for receiving the valve stem is determined by a machine vision system. An electronic control system directs a robotic manipulator to grasp either the valve stem or the rim, move the valve stem or the rim to a mounting station, position the valve stem or the rim with respect to the other such that the aperture in the rim is in coaxial alignment with the valve stem, and insert the valve stem through the aperture in the rim. If necessary, a power-actuated nut runner, mounted on the robotic manipulator or adjacent the mounting station, is used to tighten a nut over the valve stem. As an alternative to the machine vision system, the gauging station can use a rotating table which rotates the wheel about a central axis, and an "electric eye" optical sensor directing a beam of infrared light onto the rim. As the rim rotates through the beam, the presence or lack of a reflection of the light beam is used to detect the location of the aperture, and rotation of the table is stopped when the aperture is in alignment with the beam. A probe mounted on the gauging station can be extended to project into the aperture to confirm that the aperture is at the desired position and reposition the rim slightly to provide a precise positioning of the aperture.

46 Claims, 6 Drawing Sheets

U.S. PATENT DOCUMENTS

| | | |
|---|---|---|
| 5,040,290 A | 8/1991 | Usui et al. |
| 5,115,701 A | 5/1992 | Lenhert |
| 5,148,591 A | 9/1992 | Pryor |
| 5,159,745 A | 11/1992 | Kato |
| 5,206,984 A | 5/1993 | Matsumoto et al. |
| 5,219,264 A * | 6/1993 | McClure et al. ............ 414/730 |
| 5,303,463 A | 4/1994 | Pollard |
| 5,537,734 A | 7/1996 | Belka et al. |
| 5,685,210 A | 11/1997 | Ringle et al. |
| 5,741,103 A * | 4/1998 | Lee .......................... 411/366.1 |
| 5,749,141 A | 5/1998 | Matsumoto ................... 29/714 |
| 5,802,201 A * | 9/1998 | Nayar et al. ................. 382/153 |
| 5,940,960 A | 8/1999 | Dean et al. |
| 6,026,552 A | 2/2000 | Matsumoto |
| 6,481,083 B1 | 11/2002 | Lawson et al. .......... 29/407.04 |

\* cited by examiner

ROBOTIC APPARATUS AND METHOD FOR MOUNTING A VALVE STEM ON A WHEEL RIM

CROSS REFERENCE TO RELATED APPLICATION

The present application is a continuation-in-part of Ser. No. 09/344,042 filed on Jun. 25, 1999 now U.S. Pat. No. 6,481,083.

FIELD OF THE INVENTION

The present invention relates to the assembly of wheels for automotive vehicles, and more specifically to a new apparatus and method for mounting a valve stem on a wheel rim.

BACKGROUND OF THE INVENTION

The great majority of wheels produced for automotive vehicles include a metal rim, a tubeless tire mounted on the rim, and a valve stem projecting through an aperture in the rim to communicate with the interior of the tire and permit inflation.

In the past, automobile wheels have been assembled using primarily manual labor. In particular, the mounting of the valve stem to the rim has been accomplished by a hand-held stem inserter tool such as that disclosed in U.S. Pat. No. 3,852,839 and U.S. Pat. No. 4,807,343. Similarly, the mounting of the tire on the rim has involved a worker placing the rim in a fixture, positioning the tire partially over the rim, and actuating a machine for pressing the tire downwardly into position around the rim. Manual processes are expensive due to the high cost of manual labor and amount of cycle time involved in completing the assembly of one tire on a rim, and are subject to human error potentially producing defective wheels.

It is desirable to adapt modern robotic and machine vision systems to automate the manufacture of mounted tires.

SUMMARY OF THE INVENTION

The present invention provides a method and apparatus for the high volume, low cost assembly of valve stems to wheel rims. The present invention provides a completely automated method and apparatus using a robotic manipulator to handle the valve stem or rim during assembly. The present invention provides an automated assembly apparatus and method adapted to assemble different types and sizes of rims having valve stem mounting apertures at different locations and aligned at different angles. The present invention is intended for use with both normal sized and miniature rims (such as those used for compact spares on some vehicles) having an aperture passing therethrough for receiving a tubular valve stem. According to the invention, the rim is positioned in a gauging station where the location and alignment of the aperture is determined.

In one embodiment, a robotic manipulator grasps the wheel located at the gauging station and, under the direction of an electronic control system, moves the rim to a mounting station where a valve stem is retained. The manipulator positions the rim such that the aperture is in alignment with the longitudinal axis of the valve stem, and the wheel rim is then moved relative to the valve stem to insert the valve stem through the aperture in the rim.

In another embodiment, a robotic manipulator grasps the stem located at the valve stem delivery station and, under the direction of an electronic control system, moves the valve stem to the mounting station where the valve stem is to be assembled to the rim. The manipulator positions the valve stem such that the aperture in the rim is in alignment with the longitudinal axis of the valve stem, and the valve stem is then moved relative to the rim to insert the valve stem through the aperture in the rim.

According to the present invention, the gauging station can use a machine vision system to determine the radial and circumferential location of the aperture on the rim and the angle which the central axis of the aperture makes with the central axis of the rim. These factors can be determined, at least in part, by programming the machine vision system to recognize certain features of the rim which identify the rim as being an example of one of a plurality of pre-programmed types and sizes of rims. The aperture location and/or alignment information for each type and size of rim is stored for retrieval based on input from the machine vision system. The data describing the location and alignment of the aperture is relayed to the control system so that the control system can direct the robotic manipulator to properly position the rim or valve stem in relation to the other at the mounting station.

According to the present invention, the automated assembly apparatus can include a plurality of valve stem delivery stations, each containing a different type and/or size of valve stem. The machine vision system identifies a rim as being an example of one of the plurality of pre-programmed types and directs the robotic manipulator to pick up the valve stem from the appropriate valve stem delivery station, move the valve stem to the mounting station, and insert the valve stem into the aperture identified in the stationary wheel rim by the machine vision system. This allows the assembly apparatus to simultaneously handle different types and/or sizes of rims and mount the appropriate type and/or size of valve stem to each rim.

In an alternative embodiment of the invention, the gauging station can include a rotating table for receiving the wheel rim and rotating wheel rim about a central axis, and an "electric eye" optical sensor for directing a beam of infrared light onto the rim. As the rim rotates through the beam, the presence or lack of a reflection of the light beam is used to detect the location of the aperture, and rotation of the table is stopped when the aperture is in alignment with the beam. If desired, a probe mounted on the gauging station can be extended to project into the aperture to confirm the aperture is in the desired position and, if necessary, reposition the rim slightly to provide a precise positioning of the aperture. In this embodiment of the gauging station, the aperture is always in the same position relative to the gauging station, and the robotic manipulator can either grasp the rim prior to moving the rim to the mounting station, or the robotic manipulator can grasp the appropriate valve stem prior to inserting the valve stem through the located aperture in the wheel rim, or the wheel rim can be moved along the conveyor in a known orientation to a mounting station separate from the gauging station for insertion of the appropriate valve stem.

According to the present invention, a power-actuated nut runner can be used to tighten a nut over a threaded portion of the valve stem to secure the valve stem in connection with the rim. The nut runner can either be mounted on the robotic manipulator, or can be mounted on or adjacent to the mounting station.

According to the present invention, a valve stem delivery apparatus can be disposed on or adjacent the mounting station and can supply a continuous stream of valve stems for mounting to rims by the robotic manipulator at the mounting station.

In the present invention, the valve stem can either be held substantially stationary relative to the mounting station with the robotic manipulator urging the wheel rim onto the valve stem, or the wheel rim can be held substantially stationary relative to the mounting station with the robotic manipulator urging the valve stem through the aperture in the wheel rim. In either case, it has been found that the present invention of inserting the valve stem through the aperture provides for an accurate, positive, and repeatable insertion of the valve stem into the aperture.

In the present invention, the robotic manipulator can transfer the assembled rim and valve stem from the mounting station to a subsequent work station and release the rim with the valve stem in a consistent, desired reference position relative to the work station. This allows subsequent assembly steps to be performed on the rim, such as mounting of a tire, to be accomplished with reference to the position of the valve stem on the rim.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED AND ALTERNATIVE EMBODIMENTS

Figure 1:
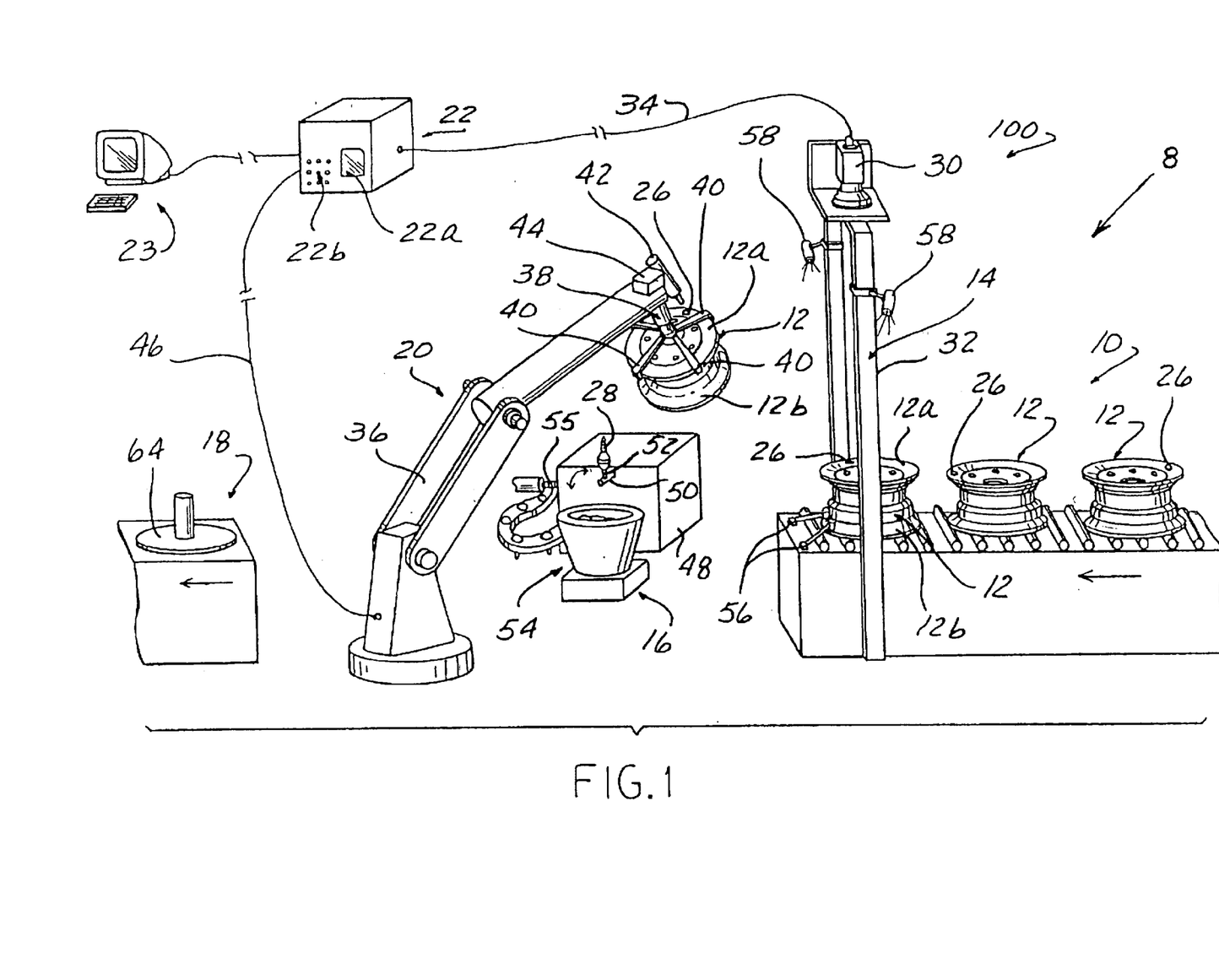
FIG. 1 is a perspective view of an apparatus according to the present invention including a machine vision system associated with a gauging station.

As seen in FIG. 1, an automated assembly line 8 for mounting valve stems to wheel rims includes an input conveyor 10 for conveying rims 12 in a single-file fashion, a gauging station 14 adjacent the end of the input conveyor, a valve stem mounting station 16 located adjacent the gauging station, an output conveyor 18 for carrying the assembled wheel/stem units away, and a robotic manipulator 20 for transferring the rims from the gauging station to the mounting station and then to the output conveyor.

Operation of the automated assembly line 8 is monitored and directed by an electronic control system, indicated schematically at 22. The control system 22 includes input/output means such as a display screen 22a and a keypad 22b for allowing a human operator (not shown) to receive information regarding the status of the line and program desired modes of operation. The control system unit 22 can be connected to and/or integrated with other information processing systems so that the assembly line 8 can be monitored and controlled from one or more locations remote from the line itself. For example, the control system 22 can be connected with a plant-wide network to allow the operation to be controlled and monitored from a computer station 23 located at some remote location.

The input conveyor 10 is shown to be of the type including a series of parallel rollers, however it can alternatively be any of the various types of conveyors known in the material handling art. The rims 12 are of the type used for automotive vehicle wheels for receiving tubeless tires (not shown), and have opposite first and second flanges 12a, 12b. The first flange 12a has an aperture 26 formed therethrough for receiving a valve stem 28.

The gauging station 14 is located at the end of the input conveyor 10 and includes a closed circuit video camera 30 mounted above the conveyor line on a support frame 32. The video camera 30 is of the type used in machine vision systems and is directed downwardly so that the camera images the upper flange 12a of a rim located in the gauging station. The output of the video camera 30 is communicated to the control system 22 by a cable 34.

The robotic manipulator 20 is of the type commonly used in modern manufacturing operations and includes an arm 36 capable of compound, multi-axial movement. A gripper 38 at the end of the arm 36 has fingers 40 actuable to alternatively grasp and release the wheel rim 12. A nut runner 42 is mounted on the robotic manipulator 20 adjacent the gripper 38. The nut runner 42 is a pneumatically or electrically powered device for rotating a threaded nut over a matingly threaded male component. A magazine 44 for holding a large number of nuts and feeding the nuts to the nut runner 42 is also mounted on the arm 36. The robotic manipulator 20 is electrically connected with the control system 22 by a cable 46.

The valve stem mounting station 16 includes a base 48 and a shaft 50 extending generally horizontally therefrom. The shaft 50 is rotatable with respect to the base 48 and is powered by, for example, a electric servomotor (not shown). A stem holding finger 52 projects from the shaft 50 for rotation therewith, and is small enough to fit within the hollow interior of a valve stem 28. A vibratory sorting and conveying mechanism 54 of the type known in the art of automated assembly is mounted on or near the base 48 and supplies a stream of valve stems 28 to an output position 55 adjacent to the finger 52.

Rotation of the shaft 50 moves the finger 52 between a first position where the shaft points toward the output position 55 of the stem conveying mechanism 54 so that a stem 28 can slide over the finger, and a second position where the finger 52 and valve stem 28 carried thereon point generally upward.

During operation of the automated stem mounting apparatus, rims 12 are placed on the input conveyor 10 at an upstream location such that the flange 12a having the valve stem aperture 26 formed therethrough is oriented upwardly. As a rim 12 reaches the end of the input conveyor 10, the rim comes into contact with one or more blocks 56 to stop the rim directly below the video camera 30 in the gauging station 14. When the rim 12 is stationary in the gauging station 14, the control system 22 activates the video camera 30 to image the rim. If ambient lighting in the vicinity of the conveyor is not sufficient to allow the video camera 30 to acquire a high resolution image, additional light fixtures 58 can be provided.

The image produced by the video camera 30 is relayed to the control system 22 where a digital pattern recognition program of the type known in the machine vision art is used to determine the location of the valve stem aperture 26 relative to the gauging station 14 and/or the type of wheel rim and/or size of wheel rim located at the gauging station. The image produced by the camera can provide sufficient information for a lookup function to be processed with respect to a stored data base for the angle a (see FIG. 2) between the central axis 60 of the aperture 26 with respect to the central axis 62 of the particular rim 12 currently being imaged at the gauging station.

It is possible for the pattern recognition software to be configured to determine the location and/or alignment of the aperture 26, at least in part, by identifying physical features of the rim 12 other than the aperture itself For example, features such as the spoke pattern and/or the diameter of the rim 12 can be used to identify the rim as being an example of one of several types and/or sizes of rims recognized by the software. The aperture location and/or alignment information for these rim types and/or sizes is stored as part of the pattern recognition software. The aperture alignment angle a can be particularly difficult to determine through direct measurement by the machine vision system, and so it can be advantageous to have this parameter stored and retrieved once the type and/or size of rim is identified.

Identification of the type and/or size of each rim processed by the assembly line 8 can also be used in other phases of the tire assembly process. This knowledge can be used, for example, to ensure that the correct tire for each rim is supplied to an automated tire mounting assembly line following the stem mounting line in a plant.

Next, the control system 22 actuates the robotic manipulator 20 to grasp the rim 12, lift the rim from the gauging station 14, and move the rim to the mounting station 16. The location and alignment of the aperture 26, as determined by the machine vision system, is used by the control system 22 to direct the robotic manipulator 20 to rotate the rim 12 as necessary to position the aperture 26 in alignment with the valve stem 28 on by the stem holding finger 52 and with the nut runner 42 (see FIG. 2).

When the aperture 26 is aligned with the valve stem 28, the robotic manipulator 20 urges the rim 12 toward the valve stem 28 so that the valve stem is inserted through the aperture 26. It is also possible for the mounting station 16 to include means for moving the valve stem 28 toward the rim 12 and into the aperture 26, rather than holding the stem stationary as the rim is urged downwardly.

Figure 2:
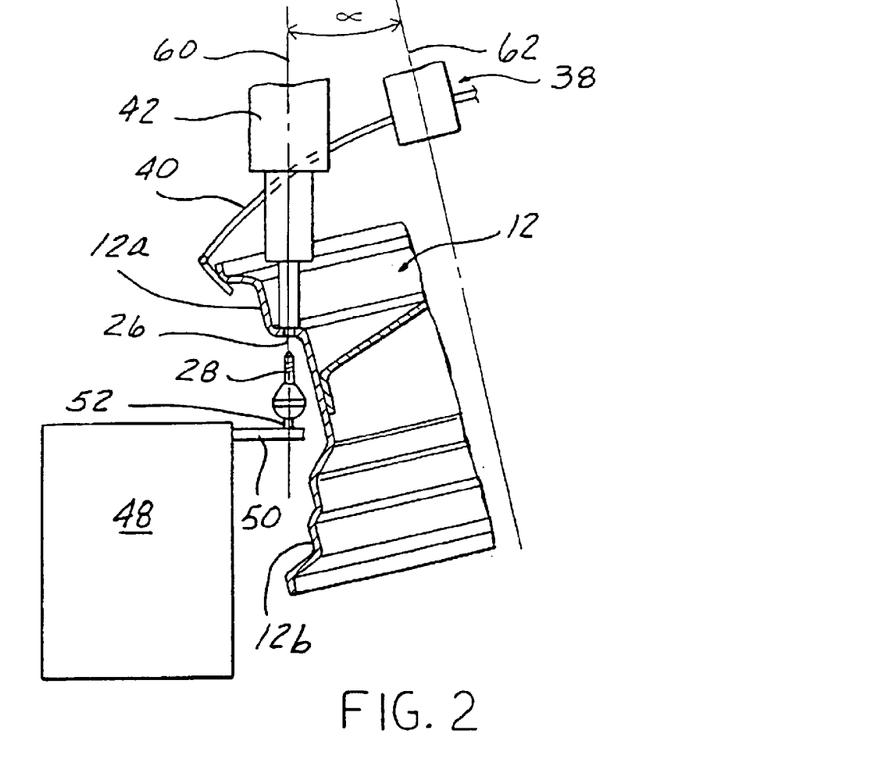
FIG. 2 is a partial side view of the mounting station with a rim positioned in preparation for being urged downwardly over a valve stem by a robotic manipulator according to one embodiment of the present invention.

As seen in FIG. 2, insertion of the valve stem 28 through the aperture 26 also results in the stem sliding into the end of the nut runner 42. The nut runner 42 is then activated to place a nut over the end of the valve stem 28 and rotate and tighten the nut, thereby securing the valve stem in connection with the rim 12.

Generally speaking, only certain specialty valve stems (for example, those having an integral pressure transducers for on-vehicle monitoring of the tire pressure) must be secured to the rim 12 with a nut. The more commonly used types of valve stems are secured to the rim 12 merely by urging the valve stems through the aperture 26. Accordingly, the nut runner 42 can be dispensed with on a valve mounting apparatus used with valve stems not requiring a nut. Alternatively, the nut runner can be retained and the control system programmed to perform or omit the nut tightening step depending on the type of valve stem and rim being assembled at any particular time.

After the valve stem 28 is secured to the rim 12, the robotic manipulator 20 is actuated by the control system 22 to lift the rim 12 away from the mounting station 16, move the rim to a station for subsequent processing, and place the rim thereon. In the embodiment of the invention shown in FIG. 1, the subsequent processing station is an output conveyor 18 including a series of platforms 64 where each platform is adapted to receive a rim 12.

Figure 6:
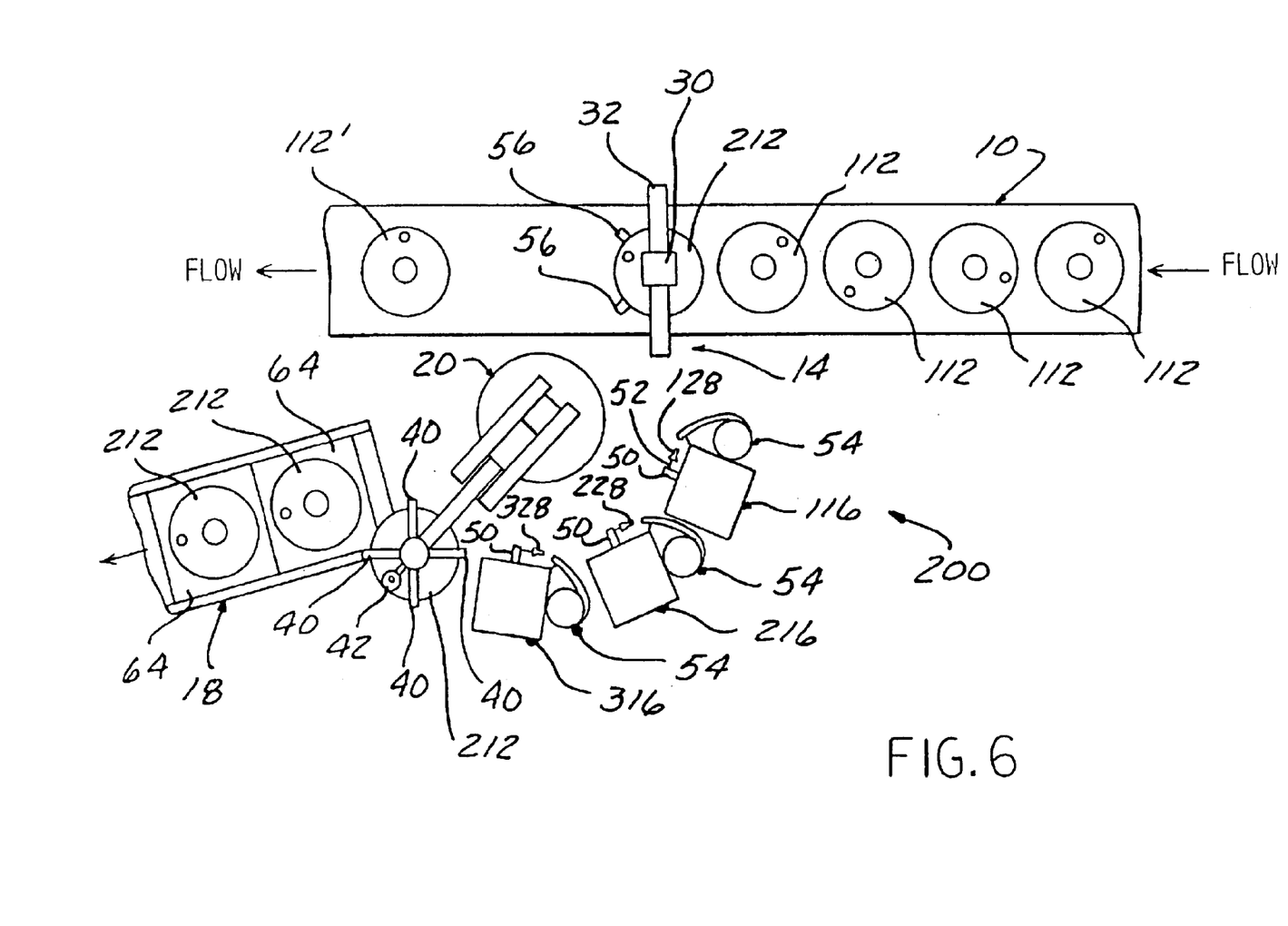
FIG. 6 is a plan view of an assembly line according to one embodiment of the present invention having multiple mounting stations.

FIG. 6 shows an assembly line 200 having three separate stem mounting stations 116, 216, 316 each loaded with a different type of valve, stem, 128, 228, 328 respectively. The different valve stems can be intended for use with different types and/or sizes of rims to be handled by the assembly line 200, and/or the stems can be different types and/or sizes to be alternatively mounted to a single type and/or size of rim. For example, the assembly line 200 is shown configured to process two different types and/or sizes of rims: a first type of rim 112 for passenger cars and a second type of rim 212 for light trucks. In this example, the passenger car rims 112 can be fitted with either a standard valve stem 128 or a special valve stem 228 having an integral pressure transducer, while all light truck rims 212 are to be fitted with a heavy duty valve stem 328.

As each rim reaches the gauging station 14, the video camera 30 images the rim and the control system 22 identifies the rim as either a car rim 112 or a truck rim 212, based on programmed physical features as described above. The control system 22 then directs the robotic manipulator 20 to move the rim to whichever of the mounting stations 116, 216, 316 is loaded with the correct stem for that rim. The nut runner 42 mounted to the robotic manipulator 20 is activated to thread a nut over the end of the valve stem only when a stem requiring such action, such as pressure transducer stem 228, has been mounted to the rim.

For the passenger car rims 112, the selection between the standard stem 128 and the pressure transducer stem 228 depends on planned production schedule information previously programmed into the control system 22 by a human operator using the key pad 22b or remote computer 23. The operator can select, monitor, and change all phases of operation of the assembly line using the display screen 22a and key pad 22b or the remote computer 23. Cumulative production data is stored by the control system 22 and can be reviewed by the operator at any time.

The assembly line 200 of FIG. 6 also differs from that of FIG. 1 in that the gauging station 14 is not located at the end of the input conveyor 10, but rather at a midpoint of the conveyor. Any rim that does not meet certain production or quality control criteria programmed into the control system 22 is placed back on the input conveyor 10, which carries the "reject" rim away. For example, in FIG. 6 a car rim 112' has been replaced on conveyor 10 after imaging because the car rim arrived at the gauging station 14 out of sequence. By way of example and not limitation, the control system 22 can be programmed to process rims only in groups of four identical rims advancing in series down the assembly line, and since the car rim 112' followed two light truck rims 212, the car rim was removed from the production sequence for failing to meet the preprogrammed criteria. Other reasons for taking a rim out of the production sequence can include the rim being positioned on the input conveyor with the aperture 26 oriented downwardly, or some incorrect rim geometry making the rim unrecognizable to the control system. Production irregularities such as these can generate a message for display on the video screen 22*a* and/or the remote computer 23 to alert the operator to a problem requiring immediate attention.

FIG. 6 also depicts a mode of operation where the robotic manipulator 20 deposits each rim 112, 212 onto a conveyor platform 64 with the mounted valve stem at a consistent and known reference angular position relative to the platform, in this case at twelve o'clock with respect to the direction of movement of conveyor 18. Having the mounted valve stem in a reference position can be desirable for accomplishing subsequent assembly steps. For example, when mounting a tire (not shown) to a rim it is generally preferable to align the heaviest point on the circumference of the rim with the lightest point on the circumference of the tire in order to achieve as close to a perfectly balanced wheel/tire combination as possible. If it is known that the valve stem is the heaviest point on the rim, placement of the rim on the output conveyor with the stem at a reference position will eliminate the necessity of locating the valve stem again prior to mounting a tire to the rim.

One advantage of the apparatus and method according to the present invention is that the robotic manipulator 20 is able to execute a complex, non-linear motion to insert the valve stem through the rim if this is necessary due to the geometry of the rim or some other consideration. Some rims, such as those used as compact spares to save space and weight in passenger vehicles, have flanges that are too close together to allow the axes of the valve stem and of the aperture to be aligned with one another and the stem inserted into the aperture by moving the rim and the stem in a straight line relative to one another.

Figure 3A:
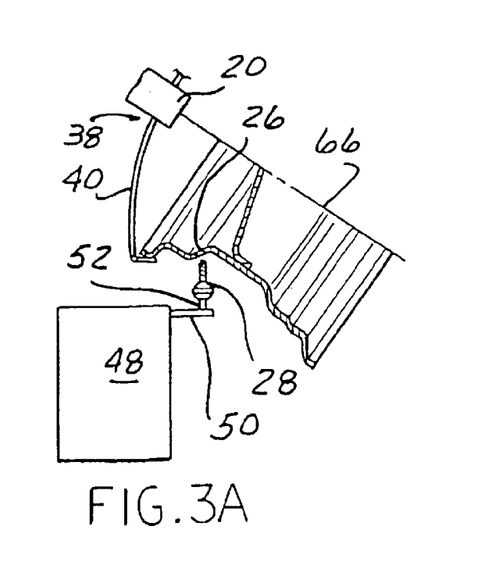
FIGS. 3A is a partial side view of the mounting station with a miniature rim prior to assembly with the valve stem.
Figure 3B:
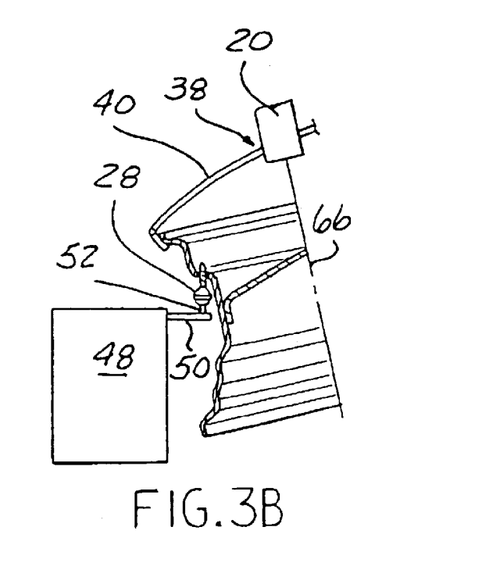
FIGS. 3B is a partial side view of the miniature rim of FIG. 3A after assembly with the valve stem.

A possible mode of operation is depicted in FIGS. 3A and 3B, which show a valve stem 28 being mounted to an undersized rim 66. The control system 22 is programmed to recognize an undersized rim 66 and direct the robotic manipulator 20 to position the rim 66 such that the tip of the valve stem 28 is adjacent aperture 26, but with the central axis of the aperture at an angle to the longitudinal axis of the stem (see FIG. 3A). The robotic manipulator 20 then rotates the rim 66 clockwise about an axis extending out of the plane of FIG. 3, while simultaneously moving the rim vertically downward to slide the valve stem 28 into the aperture 26 (see FIG. 3B).

Figure 4:
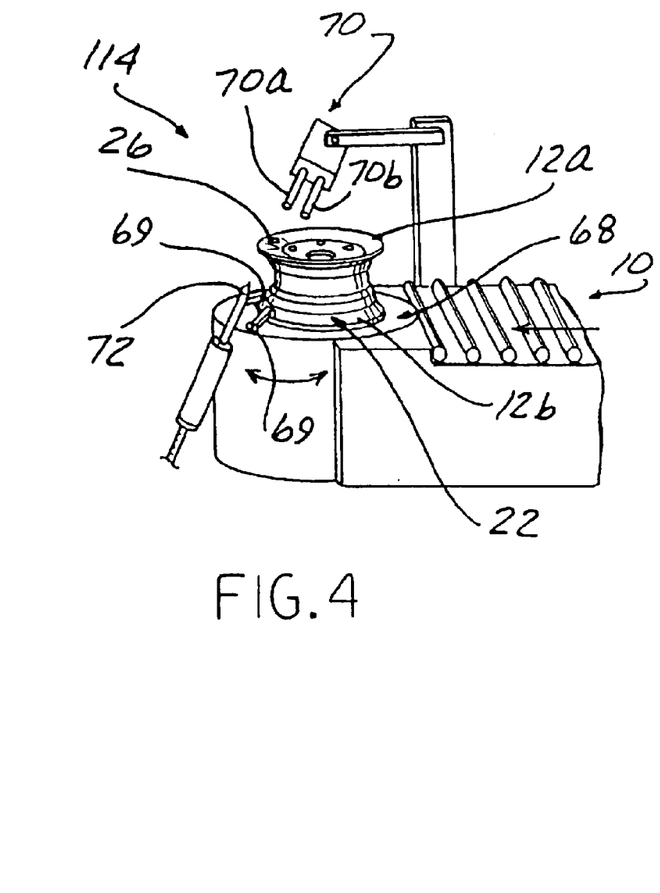
FIG. 4 is a perspective view of a gauging station according to the present invention including an electric eye.

FIG. 4 depicts an alternative embodiment of a gauging station 114 for use in conjunction with the present invention. The gauging station 114 includes a motor-driven rotating table 68 located at the end of the input conveyor 10 and an "electric eye" optical sensor 70 disposed above the table 68. The optical sensor 70 uses a beam of infrared light, as is known in the art.

The sensor 70 includes a transmitter 70*a* mounted above the rotating table 68 and aimed to direct a beam onto a rim 12 located on the table, the beam striking the flange 12*a* at a point located at the same radial distance from the central axis of the rim as the aperture 26. A receiver 70*b* is located adjacent the transmitter 70*a* so that the beam will strike the receiver 70*b* when the beam reflects off of the flange. Alternatively, the receiver 70*b* can be mounted below the upper flange 12*a* of the rim and aligned with the transmitter 70*a* to receive the beam when the beam passes through the aperture 26.

As a rim 12 reaches the end of the input conveyor 10, the rim slides onto the rotating table 68 and is stopped at that point by one or more stop blocks 69 to precisely position the rim 12 so that a central axis is in coaxial alignment with the axis of rotation of the rotating table 68. The optical sensor 70 is activated, and the rotating table 68 begins to turn so that the beam sweeps around the circumference of the flange 12*a* at the proper radial distance from the center of the rim to pass through the aperture 26 when the aperture 26 comes into alignment with the beam.

As long as the beam strikes the flange 12*a*, the beam is reflected back to the receiver 70*b*. When the aperture 26 comes into alignment with the beam, the beam is no longer reflected back to the receiver 70*b* and this change in the condition of the optical sensor 70 causes the rotating table 68 to stop so that the aperture 26 remains in alignment with the beam. The robotic manipulator 20 then grasps the rim 12 and moves the rim from the gauging station 114 to the mounting station 16. The aperture 26 is always in the same location relative to the gauging station 114 and the robotic manipulator 20, so the control system 22 directs the manipulator to execute the same motion each time the manipulator moves a rim 12 to the mounting station 16 and positions the rim for insertion of the valve stem 28.

It can be desirable to provide a mechanical means for precisely positioning the rim 12 relative to the gauging station 114 before the rim is grasped by the robotic manipulator 20. This can be achieved by a probe 72 mounted adjacent a rotating table 68 and capable of being extended upwardly to enter the aperture 26 after the rotating table 68 has stopped turning. The probe 72 has a tapered tip so that the tip will enter the aperture 26 even if the aperture 26 is slightly misaligned with the probe 72, and as the probe 72 extends fully into the aperture 26 the probe will reposition the rim 12 somewhat to correct any misalignment.

Figure 5:
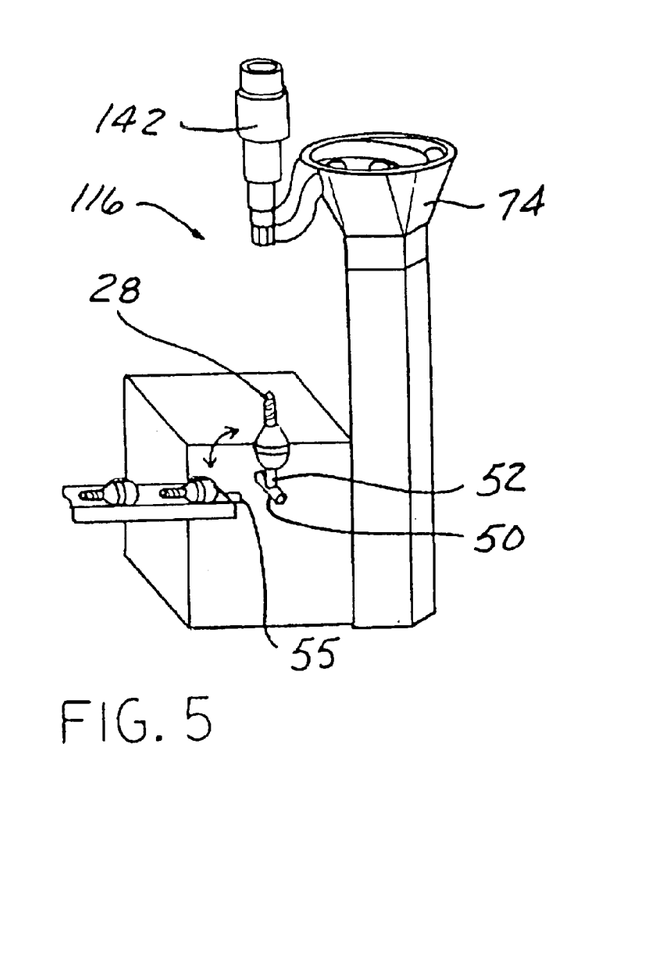
FIG. 5 is a perspective view of a mounting station according to one embodiment of the present invention having a nut runner.

FIG. 5 depicts an alternative embodiment of a mounting station 116 for use with the present invention where a nut runner 142 is mounted on or adjacent the mounting station 116 rather than being disposed on the robotic manipulator. FIG. 5 shows the nut runner 142 in a raised position where there is sufficient clearance between the valve stem holding finger 52 and the lower end of the nut runner 142 for the rim 12 to be placed over a valve stem 28 positioned on the finger. After the rim 12 has been placed over the valve stem 28, the nut runner 142 moves or telescopes downwardly (not shown) over the valve stem to place a nut over the stem and tighten the nut. A vibratory sorting and conveying apparatus 74 of the type known in the art feeds nuts to the nut runner 142.

Figure 7:
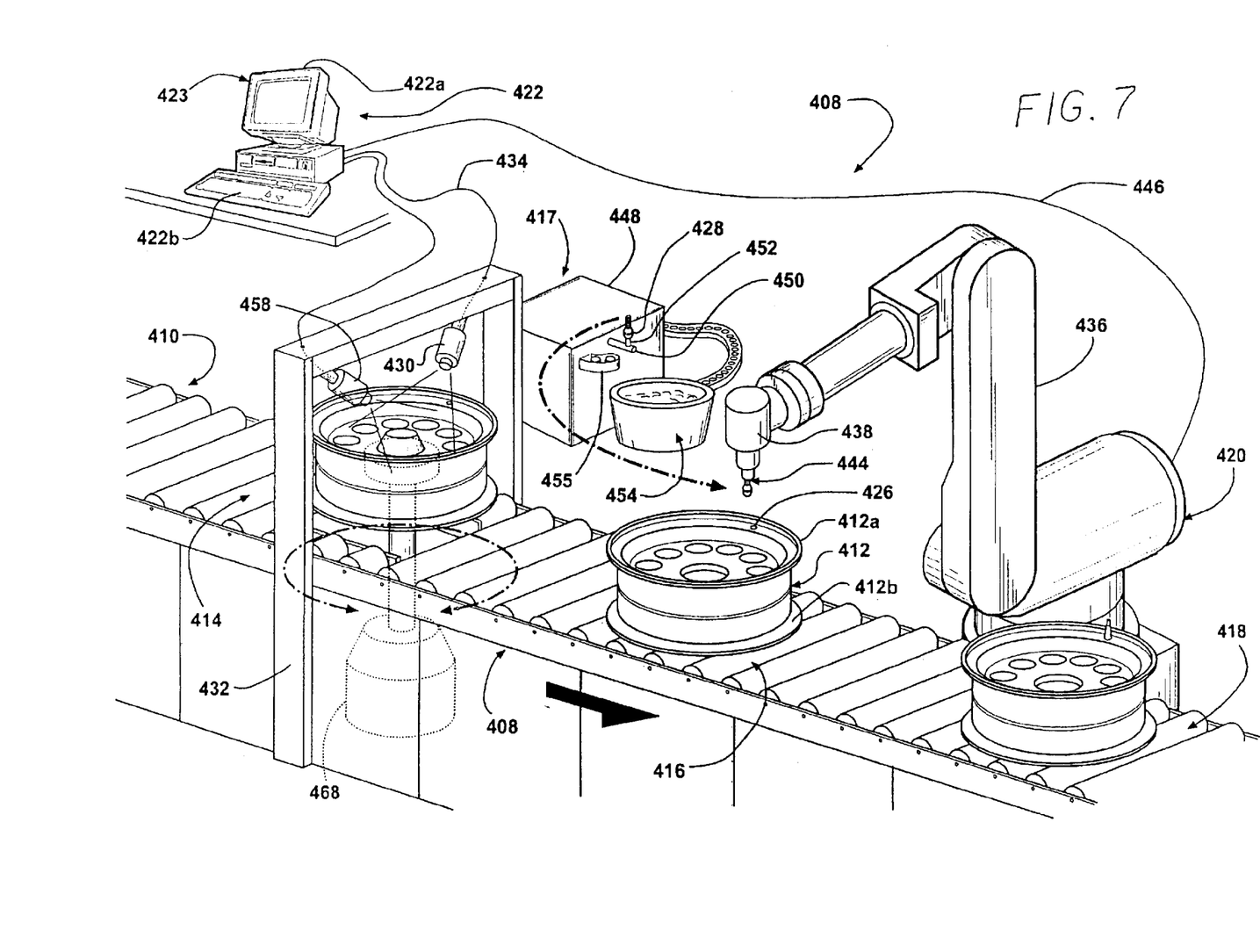
FIG. 7 is a perspective view of an alternative embodiment of the present invention illustrating a wheel rim conveyor having an aperture locating and/or wheel rim type and/or size gauging station using either a machine vision system or optical sensor, and a robotic manipulator for grasping an appropriate valve stem from a valve stem delivery station for insertion of the valve stem through the aperture in a stationary wheel rim.
Figure 8:
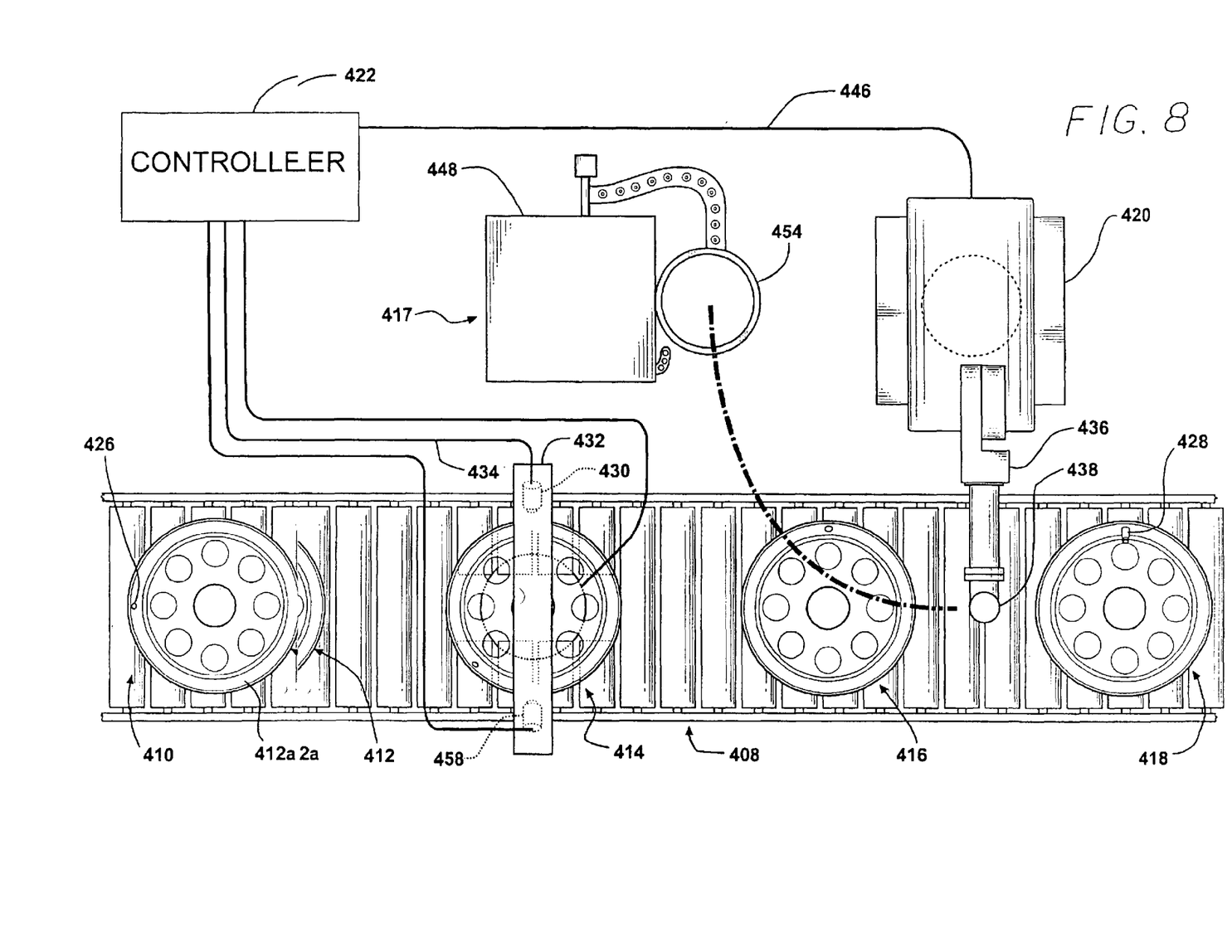
FIG. 8 is a plan view of the robotic manipulator, wheel rim conveyor including a gauging station and a mounting station, and a valve stem delivery station of FIG. 7.

Referring now to FIGS. 7 and 8, an automated assembly 408 for mounting valve stems to wheel rims includes an input portion 410 of a conveyor for conveying rims 412 in a single-file fashion, a gauging station 414 adjacent the end of the input portion 410 of the conveyor, a valve stem mounting station 416 located adjacent to the gauging station 414, an output portion 418 of the conveyor for carrying the assembled wheel/stem units away, and a robotic manipulator 420 for transferring the valve stems from the valve stem delivery station to the mounting station and for inserting the valve stem through an aperture formed in each rim 412 prior to being discharged along the output portion 418 of the conveyor.

Operation of the automated assembly line 408 is monitored and directed by an electronic control system indicated schematically at 422. The control system 422 includes input/output means, such as a display screen 422a and a keyboard 422b for allowing a human operator to receive information regarding the status of the line and to program desired modes of operation. The control system 422 can be connected/integrated with other information processing systems so that the assembly line 408 can be monitored and controlled from one or more locations remote from the line itself For example, the control system 422 can be connected with a plant-wide network to allow the operation to be controlled and monitored from a computer station 423 located at some remote location.

The input portion 410 of the conveyor is shown to be of the type including a series of parallel rollers, however it can alternatively be any of the various types of conveyors known to the material handling art. The rims 412 are of the type used for automotive vehicle wheels for receiving tubeless tires, and have opposite first and second flanges 412a, 412b. The first flange 412a has an aperture 426 formed therethrough for receiving a valve stem 428.

The gauging station 414 is located at the end of the input portion 410 of the conveyor and includes a closed circuit video camera 430 mounted above the conveyor line on a support frame 432. The video camera 430 is of the type used in machine vision systems and is directed downwardly so that the camera images the upper flange 412a of a rim located in the gauging station. The output of this video camera 430 is communicated to the control system 422 by a cable 434.

The robotic manipulator 420 is of the type commonly used in modern manufacturing operations and includes an arm 436 capable of compound, multi-axial movement. A gripper 438 at the end of the arm 436 has fingers 444 actuable to alternatively grip and release the valve stem 428. A nut runner can be mounted on the robotic manipulator 420 adjacent the gripper 438. The nut runner can be a pneumatic or electrically powered device for rotating a threaded nut over a matingly threaded male component. A magazine can be provided for holding a large number of nuts and feeding the nuts to the nut runner. The magazine for holding the nuts can also be mounted on the arm 436. The robotic manipulator 420 is electrically connected with the control system 422 by a cable 446.

The valve stem delivery station 417 includes a base 448 and a shaft 450 extending generally horizontally therefrom. The shaft 450 is rotatable with respect to the base 448 and is powered by, for example, an electric servo motor. A stem holding finger 452 projects from the shaft 450 for rotation therewith and is small enough to fit within the hollow interior of a valve stem 428. A vibratory sorting and conveying mechanism 454 of the type know in the art of automated assembly is mounted on or near the base 448 and supplies a stream of valve stems 428 to an output portion 455 adjacent to the finger 452.

Rotation of the shaft 450 moves the finger 452 between a first position where the shaft points toward the output position 455 of the stem conveying mechanism 454 so that the stem 428 can slide over the finger, and a second position where the finger 452 and valve stem 428 carry thereon point generally upward.

During operation of the automated stem delivery apparatus, rims 412 are placed on the input portion of the conveyor 410 at an upstream location such that the flange 412a having the valve stem aperture 426 form therethrough is oriented upwardly. As a rim 412 reaches the end of the input portion 410 of the conveyor, the rim comes in contact with one or more blocks to stop the rim directly below the video camera 430 in the gauging station 414. When the rim 412 is stationary in the gauging station 414, the control system 422 activates the camera 430 to image the rim. If ambient lighting in the vicinity of the conveyor is not sufficient to allow the video camera 430 to acquire a high resolution image, additional lighting fixture 458 can be provided.

The image produced by the video camera 430 is relayed to the control system 422 where a digital pattern recognition program of the type know in the machine vision art is used to determine the location of the valve stem aperture 426 relative to the gauging station 414 and/or the type of wheel rim and/or size of wheel rim located at the gauging station. The image produced by the camera can provide sufficient information for a lookup function to be processed with respect to a stored data base for the angle a between the central axis of the aperture 426 with respect to the central axis of the particular rim 412 currently being imaged at the gauging station, as previously described with respect to FIG. 2.

It is possible for the pattern recognition software to be configured to determine the location and/or alignment of the aperture 426, at least in part, by identifying physical features of the rim 412 other than the aperture itself For example, features such as the spoke pattern and/or the diameter of the rim can be used to identify the rim as being an example of one several types and/or sizes of rims recognized by the software. The aperture location and/or alignment information for these rim types and/or sizes is stored as part of the pattern recognition software. The aperture alignment angle a can be particularly difficult to determine through direct measurement by the machine vision system, and so it can be advantageous to have this parameter stored and retrieved once the type and/or size of rim is identified.

Identification of the type and/or size of each rim processed by the assembly line 408 can also be used in other phases of the tire assembly process. This knowledge can be used, for example, to insure that the correct tire for each rim is supplied to an automated tire mounting assembly line following the stem mounting line in a plant.

Next, the control system 422 actuates the robotic manipulator 420 to grasp the valve stem 428, lift the valve stem 428 from the valve stemmed delivery station, and moves the valve stem 428 to the mounting station 416. The location and alignment of the aperture 426, as determined by the machine vision system, is used by the control system 422 to direct the robotic manipulator 420 to move the valve stem 428 through any necessary compound, multi-axial movement of the arm 436 to the proper orientation for alignment with and insertion through the aperture 426 formed in the rim 412 held stationary on the conveyor. The location and alignment of the aperture 426, as determined by the machine vision system, is used by the control system 422 to direct the robotic manipulator 420 to manipulate the valve stem 428 as necessary to position the valve stem in alignment with the aperture 426 and to insert the valve stem 428 through the aperture 426 in the rim 412.

When the valve stem 428 is aligned with the aperture 426, the robotic manipulator 420 urges the valve stem 428 toward the aperture 426 in the rim 412 so that the valve stem is inserted through the aperture 426. It is also possible for the mounting station 416 to include means for moving the rim 412 toward the valve stem 428 and into the aperture 426, rather than holding the rim 412 stationary as the valve stem is urged through the aperture 426.

Insertion of the valve stem 428 through the aperture 426 can also result in the stem sliding into the end of a nut runner as previously described with respect to FIG. 2. The nut runner can then be activated to place a nut over the end of the valve stem and rotate to tighten the nut, thereby securing the valve stem in connection with the rim when appropriate. As previously indicated, only certain specialty valve stems must be secured to the rim 412 with a nut. The more commonly used types of valve stems are secured to the rim 412 merely by urging the valve stem 428 through the aperture 426. Accordingly, the nut runner can be dispensed with on a valve mounting apparatus used with valve stems not requiring a nut. Alternatively, the nut runner can be retained and the control system programmed to perform or omit the nut tightening step depending on the type of valve stem and rim being assembled at any particular time.

After the valve stem 428 is secured to the rim 412, the robotic manipulator 420 is actuated by the control system 422 to clear the rim 412, away from the mounting station 416, and the rim 412 is released for further movement along the conveyor to a station for subsequent processing.

While not shown in FIGS. 7 and 8, as previously indicated the assembly line can include a plurality of separate stem delivery stations, where each station is loaded with a different type of valve stem respectively. The different valve stems can be intended for use with different types and/or sizes of rims to be handled by the assembly line, and/or the stems can be different types and/or sizes to be alternatively mounted to a single type and/or size of rim. For example, the assembly line can be configured to process two different types and/or sizes of rims; a first type of rim for passenger cars, and a second type of rim for light trucks. In this example, the passenger car rims can be fitted with either a standard valve stem or a special valve stem having an integral pressure transducer, while all light truck rims are to be fitted with a heavy duty valve stem.

As each rim reaches the gauging station 414, the video camera 430 images the rim and the control system 422 identifies the rim as either a car rim or a truck rim based on programmed physical features as described above. The control system 422 then directs the robotic manipulator 420 to move to the appropriate valve stem delivery station where the correct valve stem for that rim is picked up by the robotic manipulator 420. The robotic manipulator 420 moves the correct valve stem for that rim to the mounting station on the conveyor where the rim is being held stationary. The robotic manipulator 420 then aligns the correct valve stem for that rim with the aperture in the rim whose location was previously identified by the video camera 430. When properly aligned, the robotic manipulator 420 inserts the correct valve stem 428 through the aperture 426 in the rim 412. If necessary, a nut runner is activated to thread a nut over the end of the valve stem.

For the passenger car rims, the selection between the standard stem and the pressure transducer depends on planned production schedule information previously programmed into the control system 422 by a human operator using the keypad 422b or a remote computer 423. The operator can select, monitor, and change all phases of operation of the assembly line using the display screen 422a and keypad 422b or the remote computer 423. Accumulative production data is stored by the control system 422 and can be reviewed by the operator at any time.

As best seen in FIG. 7, the gauging station can include a motor-driven rotating table 468 located at the end of the input portion 410 of the conveyor. After being imaged by the video camera 430, the rim 412 can be rotated by the motor-driven rotating table 468 until the aperture is in a predetermined location with respect to the conveyor. The final position of the aperture with respect to the conveyor can be confirmed by the video camera 430 or by the use of an appropriate optical sensor and a transmitter as are known in the art. The orientation process of the rim 412 can be performed to simplify the compound, multi-axis manipulation required by the robotic manipulator to axially align and insert the valve stem 428 through the aperture 426 in the rim 412. The angular orientation of the rim 412 may be required under certain circumstances to optimize performance of the robotic manipulator 420, or to provide sufficient clearance so that the robotic manipulator 420 has unfettered access to the rim 412 for performing the alignment of the valve stem 428 with the aperture 426 to allow proper insertion of the valve stem 428 through the aperture 426 in the wheel rim 412. The insertion of the valve stem 428 through the aperture 426 in the wheel rim 412 can be performed at the gauging station 414, or can be performed at a separate mounting station 416 downstream from the gauging station 414 along the conveyor.

It should be recognized that the alternative configurations described with respect to one embodiment of the invention can be used in combination with one another, or in combination with other embodiments of the invention as described herein without departing from the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for assembling a valve stem to a wheel rim having an aperture formed therein comprising the steps of:
   determining a location of the aperture relative to a gauging station;
   coaxially aligning a central axis of the aperture and a longitudinal axis of the valve stem with respect to one another prior to insertion of the valve stem through the aperture; and
   moving the valve stem relative to the rim along a programmable path of travel during the coaxially aligning step and along the aligned axes to insert the valve stem through the aperture, the path of travel defined with a programmable robotic manipulator having an arm capable of compound, multi-axial movement and having a plurality of programmed paths corresponding to a plurality of different size wheel rim and valve stem combinations to be assembled.

2. The method of claim 1 wherein the determining step further comprises the step of:
   identifying at least one physical feature of the rim with a machine vision system.

3. The method of claim 1 wherein the aligning step further comprises the step of:
   selectively moving the valve stem to the gauging station from one of a plurality of valve stem delivery stations in response to the determining step, each delivery station having a differently configured valve stem mounted thereon.

4. The method of claim 1 wherein the determining step further comprises the step of:

identifying the rim as one of a plurality of different types of rims in response to the inspection with a machine vision system.

5. The method of claim 1 further comprising the step of:

tightening a nut over a threaded portion of the valve stem extending from the rim after the valve stem has been inserted with respect to the aperture.

6. The method of claim 5 wherein the nut is tightened to the valve stem by a nut runner mounted on the robotic manipulator.

7. The method of claim 5 wherein the nut is tightened to the valve stem by a nut runner mounted adjacent to the gauging station.

8. The method of claim 1 further comprising the step of:

conveying valve stems to a delivery station in a serial fashion with conveying means.

9. The method of claim 1 wherein the moving step further comprises the steps of:

holding the rim substantially stationary; and urging the valve stem toward the rim with the robotic manipulator.

10. The method of claim 1 further comprising the step of:

moving the rim and attached valve stem from the gauging station to a subsequent processing station such that the run is oriented with the valve stem in a predetermined angular position relative to the subsequent processing station.

11. The method of claim 1 further comprising the step of:

grasping the valve stem with the robotic manipulator and moving along the path of travel in response to computer-controlled signals.

12. The method of claim 11 further comprising the step of:

actuating the robotic manipulator to move the valve stem to the rim located at a delivery station.

13. The method of claim 1 further comprising the step of:

grasping the valve stem with the robotic manipulator computer-controlled and having a valve-stem-gripper-attachment articulatable and positionable to be in a predetermined orientation with respect to the aperture in the rim.

14. The method of claim 13 further comprising the step of:

orienting the aperture of the wheel rim in a predetermined location with the respect to the valve-stem-gripper-attachment as a result of articulation and positioning of the valve-stem-gripper-attachment by the robotic manipulator prior to the inserting step.

15. The method of claim 13 further comprising the step of:

orienting the aperture of the wheel rim in a predetermined location with respect to the gauging station as a result of rotational movement of the rim until the aperture is properly located with respect to the gauging station prior to the inserting step; and the inserting step performed with the valve-stem-gripper-attachment in a predetermined position with respect to the gauging station as a result of articulation and positioning of the valve-stem-gripper-attachment by the robotic manipulator prior to the inserting step.

16. A method for assembling a valve stem to a wheel rim having an aperture formed therein comprising the steps of:

determining a location of the aperture relative to a gauging station by positioning the rim on a rotatable table, directing an optical sensor at the rim, rotating the table and the rim, and stopping rotation of the table and rim when the optical sensor is directed at the aperture;

coaxially aligning a central axis of the aperture and a longitudinal axis of the valve stem with respect to one another prior to insertion of the valve stem through the aperture; and moving the valve stem relative to the rim along a programmable path of travel during the coaxially aligning step and along the aligned axes to insert the valve stem through the aperture, the path of travel defined with a programmable robotic manipulator having an arm capable of compound, multi-axial movement and having a plurality of programmed paths corresponding to a plurality of different size wheel rim and valve stem combinations to be assembled.

17. The method of claim 16 further comprising the step of:

inserting a mechanical probe into the aperture to verify the location of the aperture before insertion of the valve stem through the aperture.

18. The method of claim 17 wherein the inserting step further comprises the step of:

moving the rim with the probe to align the aperture with respect to the probe.

19. An apparatus for assembling a valve stem to a wheel rim having an aperture formed therein comprising:

means for determining a location of the aperture relative to a gauging station;

means for coaxially aligning the central axis of the aperture and a longitudinal axis of the valve stem with respect to one another prior to insertion of the valve stem through the aperture; and means for moving the valve stem relative to the rim along a programmable path of travel including alignment of the central axis of the aperture with the longitudinal axis of the valve stem and along the aligned axes to insert the valve stem through the aperture, the path of travel defined with a programmable robotic manipulator having an arm capable of compound, multi-axial movement and having a plurality of programmed paths corresponding to a plurality of different size wheel rim and valve stem combinations to be assembled.

20. The apparatus of claim 19 wherein the means for determining further comprises:

a machine vision system to identify at least one physical feature of the rim.

21. The apparatus of claim 20 wherein the aligning means further comprises:

the robotic manipulator to selectively move the valve stem from one of a plurality of delivery stations having different valve stems mounted thereon in response to the identification by the machine vision system.

22. The apparatus of claim 19 wherein the means for determining further comprises:

a machine vision system to identify the rim as being one of a plurality of different rims.

23. The apparatus of claim 19 further comprising:

means for tightening a nut over a threaded portion of the valve stem extending from the rim to secure the valve stem to the rim.

24. The apparatus of claim 23 wherein the means for tightening further comprises:

a nut runner mounted on the robotic manipulator.

25. The apparatus of claim 23 wherein the means for tightening further comprises:

a nut runner mounted adjacent to a gauging station where the valve stem is moved relative to the rim to insert the valve stem with respect to the aperture.

26. The apparatus of claim 19 further comprising:
means for supplying valve stems in a serial fashion to a delivery station where the valve stem is moved relative to the rim to insert the valve stem with respect to the aperture.

27. The apparatus of claim 19 wherein the means for moving further comprises:
the robotic manipulator to urge the valve stem toward the rim.

28. The apparatus of claim 19 further comprising:
the robotic manipulator for moving the rim and attached valve stem from a gauging station where the valve stem is mounted with respect to the aperture to a processing station while maintaining the valve stem in a predetermined angular position relative to the processing station.

29. The apparatus of claim 19 further comprising:
means for grasping the valve stem with the robotic manipulator computer-controlled and having a valve-stem-gripper-attachment articulatable and positionable to be in a predetermined orientation with respect to the aperture in the rim.

30. The apparatus of claim 29 further comprising:
means for orienting the aperture of the wheel rim in a predetermined location as a result of articulation and positioning movement of the valve stem with the robotic manipulator.

31. An apparatus for assembling a valve stem to a wheel rim having an aperture formed therein comprising:
means for determining a location of the aperture relative to a gauging station, said means for determining comprising a rotatable table for selectively rotating the rim and an optical sensor to detect the location of the aperture as the rim is rotated;
means for coaxially aligning the central axis of the aperture and a longitudinal axis of the valve stem with respect to one another prior to insertion of the valve stem through the aperture; and
means for moving the valve stem relative to the rim along a programmable path of travel including alignment of the central axis of the aperture with the longitudinal axis of the valve stem and along the aligned axes to insert the valve stem through the aperture, the path of travel defined with a programmable robotic manipulator having an arm capable of compound, multi-axial movement and having a plurality of programmed paths corresponding to a plurality of different size wheel rim and valve stem combinations to be assembled.

32. The apparatus of claim 31 further comprising:
a probe extendable through the aperture after the rim has been rotated to verify the location of the aperture prior to insertion of the valve stem through the aperture.

33. The apparatus of claim 32 wherein the probe is operable to reposition the rim to bring the aperture into alignment with the probe.

34. An apparatus for assembling a valve stem to a wheel rim having an aperture formed therein comprising:
means for determining a location of the aperture relative to a gauging station;
means for coaxially aligning the central axis of the aperture and a longitudinal axis of the valve stem with respect to one another prior to insertion of the valve stem through the aperture; and
means for moving the valve stem relative to the rim alone a programmable path of travel including alignment of the central axis of the aperture with the longitudinal axis of the valve stem and alone the aligned axes to insert the valve stem through the aperture, the path of travel defined with a programmable robotic manipulator having an arm capable of compound, multi-axial movement and having a plurality of programmed paths corresponding to a plurality of different size wheel rim and valve stem combinations to be assembled;
means for grasping the valve stem with the robotic manipulator computer-controlled and having a valve-stem-gripper-attachment articulatable and positionable to be in a predetermined orientation with respect to the aperture in the rim;
means for orienting the aperture of the wheel rim in a predetermined location as a result of movement of the rim at the gauging station prior to the valve stem being inserted by the robotic manipulator.

35. A method for assembling a valve stem to a wheel rim having an aperture formed therein comprising the steps of:
determining the location of the valve stem aperture in the rim; and
operably engaging the valve stem with a robotic manipulator;
moving the valve stem relative to the rim along a programmable path of travel;
coaxially aligning the valve stem and the aperture; and
inserting at least a portion of the valve stem through the aperture in the rim, wherein the path of travel is defined with a programmable robotic manipulator having an arm capable of compound, multi-axial movement and having a plurality of programmed paths corresponding to a plurality of different size wheel rim and valve stem combinations to be assembled.

36. The method according to claim 35 further comprising the steps of operably engaging the valve stem and moving the valve stem towards the rim.

37. The method according to claim 35 further comprising the step of securing the valve stem to the rim by tightening a nut over a threaded portion of the valve stem extending from the rim.

38. The method of claim 35 further comprising the step of:
grasping the valve stem with the robotic manipulator computer-controlled and having a valve-stem-gripper-attachment articulatable and positionable to be in a predetermined orientation with respect to the aperture in the rim.

39. The method of claim 38 further comprising the step of:
orienting the aperture in the rim to a predetermined location during movement of the valve stem with the robotic manipulator as a result of articulation and positioning of the valve-stem-gripper-attachment.

40. The method of claim 38 further comprising the step of:
orienting the aperture in the rim to a predetermined location at a station prior to the inserting step.

41. A method for assembling a valve stem to a wheel rim having an aperture formed therein comprising the stems of:
determining the location of the valve stem aperture in the rim by inserting a mechanical probe into the aperture prior to insertion of the valve stem through the aperture to verify the location of the apertures;
operably engaging the valve stem with a robotic manipulator;
moving the valve stem relative to the rim alone a programmable path of travel;
coaxially aligning the valve stem and the aperture; and inserting at least a portion of the valve stem through the aperture in the rim, wherein the path of travel is defined with a programmable robotic manipulator having an arm capable of compound, multi-axial movement and having a plurality of programmed paths corresponding to a plurality of different size wheel rim and valve stem combinations to be assembled.

42. An apparatus for assembling a valve stem to a wheel run having an aperture formed therein comprising:

means for determining the location of the valve stem aperture in the rim; and means for operably engaging the valve stem;

means for moving the valve stem relative to the rim along a programmable path of travel; and means for coaxially aligning the valve stem and the aperture to insert at least a portion of the valve stem through the aperture in the rim, wherein the path of travel is defined with a programmable robotic manipulator having an arm capable of compound, multi-axial movement and having a plurality of programmed paths corresponding to a plurality of different size wheel rim and valve stem combinations to be assembled.

43. The apparatus of claim 42 further comprising:

means for grasping the valve stem with the robotic manipulator computer-controlled and having a valve-stem-gripper-attachment articulatable and positionable to be in a predetermined orientation with respect to the aperture in the rim.

44. The apparatus of claim 43 further comprising:

means for orienting the aperture of the wheel rim in a predetermined location with respect to the valve-stem-gripper-attachment as a result of articulation and positioning of the valve-stem-gripper-attachment by the robotic manipulator prior to inserting the valve stem.

45. The apparatus of claim 42 wherein said means for determining the location of the valve stem aperture in the run includes means for inserting a mechanical probe into the aperture prior to insertion of the valve stem through the aperture to verify the location of the aperture.

46. An apparatus for assembling a valve stem to a wheel rim having an aperture formed therein comprising:

means for determining the location of the valve stem aperture in the rim; and means for operably engaging the valve stem;

means for moving the valve stem relative to the rim along a programmable path of travel; and means for coaxially aligning the valve stem and the aperture to insert at least a portion of the valve stem through the aperture in the rim, wherein the oath of travel is defined with a programmable robotic manipulator having an arm capable of compound, multi-axial movement and having a plurality of programmed paths corresponding to a plurality of different size wheel rim and valve stem combinations to be assembled;

said means for operably engaging the valve stem including means for grasping the valve stem with the robotic manipulator computer-controlled and having a valve-stem-gripper-attachment articulatable and positionable to be in a predetermined orientation with respect to the aperture in the rim; and means for orienting the aperture of the wheel rim in a predetermined location with respect to a gauging station as a result of rotational movement of the rim until the aperture is located with respect to the gauging station prior to inserting the valve stem; and said grasping means including the valve-stem-gripper-attachment in a predetermined position with respect to the gauging station as a result of articulation and positioning of the valve-stem-gripper-attachment by the robotic manipulator prior to inserting the valve stem.

* * * * *

UNITED STATES PATENT AND TRADEMARK OFFICE
CERTIFICATE OF CORRECTION

PATENT NO. : 6,886,231 B2
APPLICATION NO. : 10/264746
DATED : May 3, 2005
INVENTOR(S) : Lawson et al.

It is certified that error appears in the above-identified patent and that said Letters Patent is hereby corrected as shown below:

<u>Column 1:</u>
Line 7, Insert --co-pending-- before "Ser.".

<u>Column 5:</u>
Line 20, "a" should be --α--.
Line 27, Insert --.-- after "itself".
Line 33, "a" should be --α--.

<u>Column 6:</u>
Line 21, Delete "," after "valve".

<u>Column 9:</u>
Line 9, Insert --.-- after "itself".

<u>Column 10:</u>
Line 31, "a" should be --α--.

<u>Column 13:</u>
Line 27, Claim 10, "run" should be --rim--.

<u>Column 15:</u>
Line 66, Claim 34, "alone" should be --along--.

<u>Column 16:</u>
Line 2, Claim 34, "alone" should be --along--.
Line 56, Claim 41, "stems" should be --steps--.
Line 60, Claim 41, "apertures" should be --aperture--.
Line 63, Claim 41, "alone" should be --along--.

UNITED STATES PATENT AND TRADEMARK OFFICE
CERTIFICATE OF CORRECTION

PATENT NO. : 6,886,231 B2
APPLICATION NO. : 10/264746
DATED : May 3, 2005
INVENTOR(S) : Lawson et al.

It is certified that error appears in the above-identified patent and that said Letters Patent is hereby corrected as shown below:

Column 17:
Line 9, Claim 42, "run" should be --rim--.
Line 36, Claim 45, "run" should be --rim--.

Column 18:
Line 12, Claim 46, "oath" should be --path--.

Signed and Sealed this

Thirtieth Day of September, 2008

JON W. DUDAS
*Director of the United States Patent and Trademark Office*